(12) United States Patent
DiGirolamo et al.

(10) Patent No.: US 8,130,724 B2
(45) Date of Patent: Mar. 6, 2012

(54) METHOD AND APPARATUS FOR HANDLING CELL RESELECTIONS AND TRANSITIONS TO AND FROM AN ENHANCED CELL_FACH STATE

(75) Inventors: Rocco DiGirolamo, Laval (CA); Diana Pani, Montreal (CA); Paul Marinier, Brossard (CA); Christopher R. Cave, Verdun (CA)

(73) Assignee: InterDigital Technology Corporation, Wilmington, DE (US)

( * ) Notice: Subject to any disclaimer, the term of this patent is extended or adjusted under 35 U.S.C. 154(b) by 854 days.

(21) Appl. No.: 12/112,097

(22) Filed: Apr. 30, 2008

(65) Prior Publication Data
US 2008/0267061 A1    Oct. 30, 2008

Related U.S. Application Data

(60) Provisional application No. 60/915,048, filed on Apr. 30, 2007, provisional application No. 60/944,661, filed on Jun. 18, 2007, provisional application No. 60/944,540, filed on Jun. 18, 2007, provisional application No. 60/955,578, filed on Aug. 13, 2007.

(51) Int. Cl.
*H04W 36/00* (2009.01)
(52) U.S. Cl. .................... 370/331; 455/436
(58) Field of Classification Search .............. None
See application file for complete search history.

(56) References Cited

U.S. PATENT DOCUMENTS

| | | | |
|---|---|---|---|
| 7,286,563 B2 * | 10/2007 | Chang et al. | 370/469 |
| 2003/0016698 A1 | 1/2003 | Chang et al. | |
| 2003/0147370 A1 * | 8/2003 | Wu | 370/338 |
| 2003/0207702 A1 | 11/2003 | Chen | |
| 2004/0203778 A1 * | 10/2004 | Kuo et al. | 455/436 |
| 2005/0070252 A1 * | 3/2005 | Farnsworth | 455/412.1 |
| 2006/0240830 A1 * | 10/2006 | Ranta-aho et al. | 455/436 |
| 2007/0047452 A1 * | 3/2007 | Lohr et al. | 370/242 |
| 2008/0008152 A1 * | 1/2008 | Lohr et al. | 370/342 |
| 2008/0089285 A1 * | 4/2008 | Pirskanen et al. | 370/329 |
| 2008/0233950 A1 * | 9/2008 | Kuo | 455/424 |
| 2008/0279194 A1 * | 11/2008 | Tseng | 370/394 |
| 2009/0086756 A1 * | 4/2009 | Tseng | 370/469 |

FOREIGN PATENT DOCUMENTS
EP    1 973 364    9/2008

OTHER PUBLICATIONS

InterDigital, "Correction to UE Behavior to Disable HS-DSCH Operation When HS-DSCH Reception Is Unavailable", Change Request, 25.331 CR3079, Current Version 7.5.0, 3GPP TSG-WG2 Meeting #59, R2-073697, (Ahtens, Greece, Aug. 20-24, 2007).
InterDigital, "Additional Cases of MAC-ehs Reset for UEs Operating in Enhanced CELL_FACH," 3GPP TSG-RAN WG2#59, R2-073179 (Aug. 20-24, 2007).
InterDigital, "Cell Reselection Issues during RRC Connection Establishment Procedure," 3GPP TSG-RAN WG2#59, R2-073178 (Aug. 20-24, 2007).

(Continued)

*Primary Examiner* — Robert Scheibel
(74) *Attorney, Agent, or Firm* — Robert J. Irvine, III; Eric Berkowitz

(57) ABSTRACT

A method and apparatus for handling cell reselections and transitions includes executing a cell reselection. A medium access control (MAC)-ehs reset is performed.

26 Claims, 3 Drawing Sheets

OTHER PUBLICATIONS

InterDigital, "Disabling HS-DSCH Operation when HS-DSCH Reception is Unavailable," 3GPP TSG RAN WG2 #59, R2-073180 (Aug. 20-24, 2007).

Nokia et al., "Introduction of HS-DSCH reception in CELL_FACH, URA_PCH and CELL_PCH", Change Request, 25.331 CR3003, Rev. 2, Current Version 7.4.0, 3GPP TSG-WG2 Meeting #58, R2-072305, (Kobe, Japan, May 7-11, 2007).

Nokia et al., "Introduction of Enhanced CELL_FACH state", Change Request, 25.331, Current Version 7.3.0, 3GPP TSG-2 Meeting #57. R2-071556, (St. Julian's, Malta, Mar. 26-30, 2007).

Nokia et al, "Introduction of HS-DSCH Reception in CELL_FACH; URA_PCH and CELL_PCH," R2-072305 (May 7-11, 2007).

Nsn et al., "Introduction of HS-DSCH Reception in CELL_FACH, URA_PCH and CELL_PCH," 3GPP TSG RAN 2 #58, R2-0.72168, Kobe, Japan (May 6-11, 2007).

Third Generation Partnership Project, "Enhanced CELL_FACH state in FDD", RP-060606, (Sep. 25, 2006).

Third Generation Partnership Project, "Technical Specification Group Radio Access Network; High Speed Downlink Packet Access (HSDPA); Overall Description; Stage 2 (Release 6)," 3GPP TS 25.308 V6.4.0 (Apr. 2007).

Third Generation Partnership Project, "Technical Specification Group Radio Access Network; High Speed Downlink Packet Access (HSDPA); Overall Description; Stage 2 (Release 7)," 3GPP TS 25.308 V7.2.0 (Apr. 2007).

Third Generation Partnership Project, "Technical Specification Group Radio Access Network; High Speed Downlink Packet Access (HSDPA); Overall Description; Stage 2 (Release 7)," 3GPP TS 25.308 V7.6.0 (Mar. 2008).

Third Generation Partnership Project, "Technical Specification Group Radio Access Network; High Speed Downlink Packet Access (HSDPA); Overall Description; Stage 2 (Release 8)," 3GPP TS 25.308 V8.1.0 (Mar. 2008).

Third Generation Partnership Project, "Technical Specification Group Radio Access Network; Radio Resource Control (RRC); Protocol Specification (Release 6)," 3GPP TS 25.331 V6.13.0 (Mar. 2007).

Third Generation Partnership Project, "Technical Specification Group Radio Access Network; Radio Resource Control (RRC); Protocol Specification (Release 6)," 3GPP TS 25.331 V6.17.0 (Apr. 2008).

Third Generation Partnership Project, "Technical Specification Group Radio Access Network; Radio Resource Control (RRC); Protocol Specification (Release 7)," 3GPP TS 25.331 V7.4.0 (Apr. 2007).

Third Generation Partnership Project, "Technical Specification Group Radio Access Network; Radio Resource Control (RRC); Protocol Specification (Release 7)," 3GPP TS 25.331 V7.5.0 (Jul. 2007).

Third Generation Partnership Project, "Technical Specification Group Radio Access Network; Radio Resource Control (RRC); Protocol Specification (Release 7)," 3GPP TS 25.331 V7.8.0 (Mar. 2008).

Third Generation Partnership Project, "Technical Specification Group Radio Access Network; Radio Resource Control (RRC); Protocol Specification (Release 8)," 3GPP TS 25.331 V8.2.0 (Apr. 2008).

Third Generation Partnership Project, "Technical Specification Group Radio Access Network; MAC Protocol Specification (Release 6)," 3GPP TS 25.321 V6.12.0 (Mar. 2007).

Third Generation Partnership Project, "Technical Specification Group Radio Access Network; MAC Protocol Specification (Release 6)," 3GPP TS 25.321 V6.15.0 (Mar. 2008).

Third Generation Partnership Project, "Technical Specification Group Radio Access Network; MAC Protocol Specification (Release 7)," 3GPP TS 25.321 V7.4.0 (Mar. 2007).

Third Generation Partnership Project, "Technical Specification Group Radio Access Network; MAC Protocol Specification (Release 7)," 3GPP TS 25.321 V7.8.0 (Mar. 2008).

Third Generation Partnership Project, "Technical Specification Group Radio Access Network; MAC Protocol Specification (Release 8)," 3GPP TS 25.321 V8.1.0 (Mar. 2008).

InterDigital, "Correction to UE Behavior to Disable HS-DSCH Operation When HS-DSCH Reception Is Unavailable", Change Request, 25.331 CR3079, Current Version 7.5.0, 3GPP TSG-WG2 Meeting #59, R2-073697, (Athens, Greece, Aug. 20-24, 2007).

Nokia et al., "Introduction of HS-DSCH reception in CELL_FACH, URA_PCH and CELL_PCH", Change Request, 25.331 CR3003, Rev. 2, Current Version 7.4.0, 3GPP TSG-WG2 Meeting #58, R2-072305, (Kobe, Japan, May 7-11, 2007).

Nokia et al., "Introduction of Enhanced CELL_FACH state", Change Request, 25.331, Current Version 7.3.0, 3GPP TSG-2 Meeting #57, R2-071556, (St. Julian's, Malta, Mar. 26-30, 2007).

Third Generation Partnership Project, "Enhanced CELL_FACH state in FDD", RP-060606, (Sep. 25, 2006).

Third Generation Partnership Project, "Technical Specification Group Radio Access Network; High Speed Downlink Packet Access (HSDPA); Overall Description; Stage 2 (Release 6)," 3GPP TS 25.308 V6.4.0 (Apr. 2007).

Third Generation Partnership Project, "Technical Specification Group Radio Access Network; High Speed Downlink Packet Access (HSDPA); Overall Description; Stage 2 (Release 7)," 3GPP TS 25.308 V7.2.0 (Apr. 2007).

Third Generation Partnership Project, "Technical Specification Group Radio Access Network; High Speed Downlink Packet Access (HSDPA); Overall Description; Stage 2 (Release 7)," 3GPP TS 25.308 V7.6.0 (Mar. 2008).

InterDigital, "Correction to UE Behavior to Disable HS-DSCH Operation When HS-DSCH Reception Is Unavailable", Change Request, 25.331 CR3079, Current Version 7.5.0, 3GPP TSG-WG2 Meeting #59, R2-073697, (Athens, Greece, Aug. 20-24, 2007).

Nokia et al., "Introduction of HS-DSCH reception in CELL_FACH, URA_PCH and CELL_PCH", Change Request, 25.331 CR3003, Rev. 2, Current Version 7.4.0, 3GPP TSG-WG2 Meeting #58, R2-072305, (Kobe, Japan, May 7-11, 2007).

Nokia et al., "Introduction of Enhanced CELL_FACH state", Change Request, 25.331, Current Version 7.3.0. 3GPP TSG-2 Meeting #57, R2-071556, (St. Julian's, Malta, Mar. 26-30, 2007).

Nsn et al., "Introduction of HS-DSCH Reception in CELL_FACH, URA_PCH and CELL_PCH," 3GPP TSG RAN 2 #58, R2-0.72168, Kobe, Japan (May 6-11, 2007).

Third Generation Partnership Project, "Enhanced CELL_FACH state in FDD", RP-060606, (Sep. 25, 2006).

Third Generation Partnership Project, "Technical Specification Group Radio Access Network; High Speed Downlink Packet Access (HSDPA); Overall Description; Stage 2 (Release 6)," 3GPP TS 25.308 V6.4.0 (Apr. 2007).

Third Generation Partnership Project, "Technical Specification Group Radio Access Network; High Speed Downlink Packet Access (HSDPA); Overall Description; Stage 2 (Release 7)," 3GPP TS 25.308 V7.2.0 (Apr. 2007).

Third Generation Partnership Project, "Technical Specification Group Radio Access Network; High Speed Downlink Packet Access (HSDPA); Overall Description; Stage 2 (Release 7)," 3GPP TS 25.308 V7.6.0 (Mar. 2008).

Third Generation Partnership Project, "Technical Specification Group Radio Access Network; High Speed Downlink Packet Access (HSDPA); Overall Description; Stage 2 (Release 8)," 3GPP TS 25.308 V8.1.0 (Mar. 2008).

Third Generation Partnership Project, "Technical Specification Group Radio Access Network; Radio Resource Control (RRC); Protocol Specification (Release 6)," 3GPP TS 25.331 V6.13.0 (Mar. 2007).

Third Generation Partnership Project, "Technical Specification Group Radio Access Network; Radio Resource Control (RRC); Protocol Specification (Release 6)," 3GPP TS 25.331 V6.17.0 (Apr. 2008).

Third Generation Partnership Project, "Technical Specification Group Radio Access Network; Radio Resource Control (RRC); Protocol Specification (Release 7)," 3GPP TS 25.331 V7.4.0 (Apr. 2007).

Third Generation Partnership Project, "Technical Specification Group Radio Access Network; Radio Resource Control (RRC); Protocol Specification (Release 7)," 3GPP TS 25.331 V7.5.0 (Jul. 2007).

Third Generation Partnership Project, "Technical Specification Group Radio Access Network; Radio Resource Control (RRC); Protocol Specification (Release 7)," 3GPP TS 25.331 V7.8.0 (Mar. 2008).

Third Generation Partnership Project, "Technical Specification Group Radio Access Network; Radio Resource Control (RRC); Protocol Specification (Release 8)," 3GPP TS 25.331 V8.2.0 (Apr. 2008).

Third Generation Partnership Project, "Technical Specification Group Radio Access Network; MAC Protocol Specification (Release 6)," 3GPP TS 25.321 V6.12.0 (Mar. 2007).

Third Generation Partnership Project, "Technical Specification Group Radio Access Network; MAC Protocol Specification (Release 6)," 3GPP TS 25.321 V6.15.0 (Mar. 2008).

Third Generation Partnership Project, "Technical Specification Group Radio Access Network; MAC Protocol Specification (Release 7)," 3GPP TS 25.321 V7.4.0 (Mar. 2007).

Third Generation Partnership Project, "Technical Specification Group Radio Access Network; MAC Protocol Specification (Release 7)," 3GPP TS 25.321 V7.8.0 (Mar. 2008).

Third Generation Partnership Project, "Technical Specification Group Radio Access Network; MAC Protocol Specification (Release 8)," 3GPP TS 25.321 V8.1.0 (Mar. 2008).

InterDigital, "Correction to UE Behavior to Disable HS-DSCH Operation When HS-DSCH Reception Is Unavailable", Change Request, 25.331 CR3079, Current Version 7.5.0, 3GPP TSG-WG2 Meeting #59, R2-073697, (Athens, Greece, Aug. 20-24, 2007).

InterDigital, "Disabling HS-DSCH Operation when HS-DSCH Reception is Unavailable," 3GPP TSG RAN WG2 #59, R2-073180 (Aug. 20-24, 2007).

Nokia et al., "Introduction of HS-DSCH reception in CELL_FACH, URA_PCH and CELL_PCH", Change Request, 25.331 CR3003, Rev. 2, Current Version 7.4.0, 3GPP TSG-WG2 Meeting #58, R2-072305, (Kobe, Japan, May 7-11, 2007).

Nokia et al., "Introduction of Enhanced CELL_FACH state", Change Request, 25.331, Current Version 7.3.0, 3GPP TSG-2 Meeting #57, R2-071556, (St. Julian's, Malta, Mar. 26-30, 2007).

Nsn et al., "Introduction of HS-DSCH Reception in CELL_FACH, URA_PCH and CELL_PCH," 3GPP TSG RAN 2 #58, R2-0.72168, Kobe, Japan (May 6-11, 2007).

Third Generation Partnership Project, "Enhanced CELL_FACH state in FDD", RP-060606, (Sep. 25, 2006).

Third Generation Partnership Project, "Technical Specification Group Radio Access Network; High Speed Donwlink Packet Access (HSDPA); Overall Description; Stage 2 (Release 6)," 3GPP TS 25.308 V6.4.0 (Apr. 2007).

Third Generation Partnership Project, "Technical Specification Group Radio Access Network; High Speed Downlink Packet Access (HSDPA); Overall Description; Stage 2 (Release 7)," 3GPP TS 25.308 V7.2.0 (Apr. 2007).

Third Generation Partnership Project, "Technical Specification Group Radio Access Network; High Speed Downlink Packet Access (HSDPA); Overall Description; Stage 2 (Release 7)," 3GPP TS 25.308 V7.6.0 (Mar. 2008).

Third Generation Partnership Project, "Technical Specification Group Radio Access Network; High Speed Downlink Packet Access (HSDPA); Overall Description; Stage 2 (Release 8)," 3GPP TS 25.308 V8.1.0 (Mar. 2008).

Third Generation Partnership Project, "Technical Specification Group Radio Access Network; Radio Resource Control (RRC); Protocol Specification (Release 6)," 3GPP TS 25.331 V6.13.0 (Mar. 2007).

Third Generation Partnership Project, "Technical Specification Group Radio Access Network; Radio Resource Control (RRC); Protocol Specification (Release 6)," 3GPP TS 25.331 V6.17.0 (Apr. 2008).

Third Generation Partnership Project, "Technical Specification Group Radio Access Network; Radio Resource Control (RRC); Protocol Specification (Release 7)," 3GPP TS 25.331 V7.4.0 (Apr. 2007).

Third Generation Partnership Project, "Technical Specification Group Radio Access Network; Radio Resource Control (RRC); Specification (Release 7)," 3GPP TS 25.331 V7.5.0 (Jul. 2007).

Third Generation Partnership Project, "Technical Specification Group Radio Access Network; Radio Resource Control (RRC); Protocol Specification (Release 7)," 3GPP TS 25.311 V7.8.0 (Mar. 2008).

Third Generation Partnership Project, "Technical Specification Group Radio Access Network; Radio Resource Control (RRC); Protocol Specification (Release 8)," 3GPP TS 25.331 V8.2.0 (Apr. 2008).

Third Generation Partnership Project, "Technical Specification Group Radio Access Network; MAC Protocol Specification (Release 6)," 3GPP TS 25.321 V6.12.0 (Mar. 2007).

Third Generation Partnership Project, "Technical Specification Group Radio Access Network; MAC Protocol Specification (Release 6)," 3GPP TS 25.321 V6.15.0 (Mar. 2008).

Third Generation Partnership Project, "Technical Specification Group Radio Access Network; MAC Protocol Specification (Release 7)," 3GPP TS 25.321 V7.4.0 (Mar. 2007).

Third Generation Partnership Project, "Technical Specification Group Radio Access Network; MAC Protocol Specification (Release 7)," 3GPP TS 25.321 V7.8.0 (Mar. 2008).

Third Generation Partnership Project, "Technical Specification Group Radio Access Network; MAC Protocol Specification (Release 8)," 3GPP TS 25.321 V8.1.0 (Mar. 2008).

3rd Generation Partnership Project (3GPP), R2-072267, "Introduction of HS-DSCH reception in CELL_FACH; URA_ PCH and CELL_PCH; CR3003 to 25.331", R2-072267; 3GPP TSG-WG2 Meeting 58, Kobe, Japan, May 15, 2007, 3 pages.

International Patent Application No. PCT/US2008/061901: International Search Report dated Jan. 29, 2009, 6 pages.

International Patent Application No. PCT/US2008/061901: Notification of Transmittal of International Preliminary Report on Patentability dated Aug. 20, 2009, 13 pages.

International Patent Application No. PCT/US2008/061901: Written Opinion dated Jan. 29, 2009, 12 pages.

International Patent Application No. PCT/US20081061984: International Search Report dated Oct. 31, 2008, 3 pages.

International Patent Application No. PCT/US2008/061984: Notification of Transmittal of International Preliminary Report on Patentability dated Apr. 6, 2009, 7 pages.

International Patent Application No. PCT/US2008/061984: Written Opinion dated Oct. 31, 2008, 8 pages.

* cited by examiner

METHOD AND APPARATUS FOR HANDLING CELL RESELECTIONS AND TRANSITIONS TO AND FROM AN ENHANCED CELL_FACH STATE

CROSS REFERENCE TO RELATED APPLICATIONS

This application claims the benefit of U.S. Provisional Application Nos. 60/915,048, filed Apr. 30, 2007, 60/944,661, filed Jun. 18, 2007, 60/944,540, filed Jun. 18, 2007, and 60/955,578, filed Aug. 13, 2007, which are incorporated by reference as if fully set forth.

FIELD OF INVENTION

This application is related to wireless communications.

BACKGROUND

User equipments (UEs) in a universal telecommunications radio access network (UTRAN) are typically in either of two modes: Idle or Connected. Based on UE mobility and activity while in connected mode, the UTRAN can direct the UE to transition between a number of sub-states, such as cell paging channel (Cell_PCH), UTRAN Registration Area Paging Channel (URA_PCH), cell forward access channel (Cell_FACH), and Cell_DCH. This is typically accomplished through a network based reconfiguration procedure or as a result of a cell update procedure. The latter is initiated by the UE to tell the network about its current location. The Cell_DCH state is characterized by dedicated channels in both the uplink and the downlink. On the UE side, this corresponds to continuous transmission and reception and can be demanding on user power requirements. The Cell_FACH state does not use dedicated channels and thus allows better power consumption, at the expense of a lower uplink and downlink throughput.

Recent work by the standardization bodies has identified the possibility of using High-Speed Downlink Packet Access (HSDPA) in Cell_FACH and Cell/URA_PCH. HSDPA is a feature that was introduced in Release 5 of the Third Generation Partnership Project (3GPP) specifications to operate in Cell_DCH. HSDPA tries to make better use of the downlink shared capacity by using concepts such as Adaptive Modulation and Coding (AMC), retransmissions using a Hybrid-ARQ (HARQ) scheme, and Node B scheduling—all operating at a very fast rate. Packet data units (PDUs) are combined by the HARQ, and subsequently stored in a reordering queue to deal with possible out-of-order reception. Downlink transmissions are addressed to a UE via an HS-DSCH Radio Network Identifier (H-RNTI).

It is assumed that if the UE supports HSDPA in Release 7, then it also supports HSDPA in CELL_FACH and in CELL/URA_PCH. HS-DSCH reception in CELL_FACH can be configured without HS-DSCH reception in CELL_PCH and URA_PCH. High speed downlink shared channel (HS-DSCH) reception in CELL_PCH and URA_PCH without the support of HS-DSCH reception in CELL_FACH is not supported. The UE support for these features is signaled to the network. It should be understood that the embodiments presented can be extended to cases where the support for HSDPA in CELL_FACH and/or CELL_PCH/URA_PCH can be individually signaled to the network.

On the other hand, the network signals its support for enhanced CELL_FACH via the System Information Block (SIB5/5bis). Two new information elements (IEs) have been introduced:

"HS-DSCH common system information"—indicating the HSDPA reception is supported for CELL_FACH state; and "HS-DSCH paging system information"—indicating that HSDPA reception is supported for CELL/URA_PCH state.

To indicate whether HS-DSCH reception is ongoing in CELL_FACH, two new Boolean variables have been added:

HS_DSCH_RECEPTION_CELL_FACH_STATE: If TRUE indicates that HS_DSCH reception in CELL_FACH is ongoing; and HS_DSCH_RECEPTION_OF_CCCH_ENABLED: If TRUE indicates that HS-DSCH reception is enabled for CCCH. This variable is set to TRUE when the UE is using a common H-RNTI to receive HSDPA traffic, and is set to FALSE when the UE is not.

A UE is assigned a common H-RNTI to receive traffic when it has not been assigned a dedicated H-RNTI. Three such situations are as follows:

1) UE sends a Radio Resource Control (RRC) CONNECTION REQUEST message (and UE is waiting for an RRC CONNECTION SETUP response from the network).

2) UE sends a CELL UPDATE message and is waiting for a CELL UPDATE CONFIRM response from the network.

3) UE sends a URA UPDATE message and is waiting for a URA UPDATE CONFIRM response from the network.

No new variable has been proposed for CELL/URA_PCH HS-DSCH reception indication. When in CELL/URA_PCH, and if the IE "HS-DSCH paging system information" is broadcast, the UE sets up HSDPA reception. In some cases, a UE will no longer be able to continue reception of high speed PDUs, (e.g., as a result of a hard handover, cell reselection, radio link failure, and the like). In these cases, the MAC should be reset. The reset procedure allows the UE to forward all PDUs in the reordering queues up to higher layers, and to re-initialize all high speed state variables.

In 3GPP Release 6, HSDPA was only supported in CELL_DCH. As a result, MAC resets, (e.g., a mac-hs reset) were performed under the following conditions: the UE underwent a radio link failure, the UE experienced an RLC unrecoverable error, or the UE was ordered to transition to a state where HSDPA was not supported (all states except CELL DCH).

In Release 7, as currently defined, a UE may be required to perform a MAC reset in the following states: CELL_DCH, CELL_FACH, CELL/URA_PCH. In addition to the conditions specified above, (i.e., that apply to a UE in CELL DCH), the UE is required to perform a MAC reset after ALL cell reselections. Currently this is only done when the WTRU with a dedicated H-RNTI performs a cell reselection. There are a number of scenarios where this reset is not performed, resulting in possible reordering errors.

Transitions to/from IDLE have also been impacted by the introduction of Enhanced CELL_FACH. If a Release 7 UE supports HSDPA reception in CELL_FACH state, this UE also supports limited HSDPA reception while in IDLE mode; in particular after a UE has issued an RRC CONNECTION REQUEST, and is waiting for an RRC CONNECTION SETUP message from the network. Three issues have been identified:

1) If the UE has begun HSDPA reception while in IDLE (after issuing a RRC CONNECTION SETUP message), any cell reselections should result in a MAC reset.

2) If an RRC connection procedure is aborted, the UE should clear all its HSDPA resources.

3) While in IDLE mode, a UE may cell reselect from a cell that supports Enhanced CELL FACH to one that does not, and vice versa. If the UE has initiated an RRC connection procedure, two issues may need to be addressed. First, for a Release 6 to a Release 7 transition, the UE is required to setup the HSDPA resources so that it can receive the RRC CONNECTION SETUP message on the HS-DSCH. Second, for a Release 7 to Release 6 transition, the UE should release all HSDPA resources, as no traffic is expected on the HS-DSCH.

Another new feature of Enhanced CELL_FACH is that the UE will be able to receive dedicated control messages while in CELL_PCH (over the DCCH). Accordingly, a UE may be asked to perform a reconfiguration, (e.g., radio bearer, transport channel, physical channel). Reconfiguration messages can also result in a state change.

In order to allow proper configuration of HSDPA resources the UE should properly manage the setting or clearing of the variable HS_DSCH_RECEPTION_OF_CCCH_ENABLED to ensure that it is only set to TRUE when the UE is using the common H-RNTI while in an enhanced Cell_FACH state. It should be set to FALSE in all other. Lastly, cell reselections occurring during ongoing cell update or URA update procedures should behave similarly to cell reselections when these procedures are not ongoing.

It would therefore be beneficial to provide a method and apparatus for handling cell reselections and transitions to and from an enhanced CELL_FACH state.

SUMMARY

A method and apparatus for handling cell reselections, transitions, and Cell_DCH radio link failures is disclosed. The method includes executing a cell reselection. A medium access control (MAC)-ehs reset is performed.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

When referred to hereafter, the terminology "Release 7 (R7)", includes but is not limited to a WTRU or Node B that supports HS-DSCH in CELL_FACH and/or CELL/URA_PCH and "Release 6 (R6)" includes but is not limited to a WTRU or Node B that does not support HS-DSCH in CELL_FACH and/or CELL/URA_PCH.

HS-DSCH in CELL_FACH also includes HS-DSCH reception in idle mode for the reception of RRC connection procedures.

When referred to hereafter, the terminology "enhanced CELL_FACH state" includes but is not limited to a WTRU that is using HSDPA resources in a state other than CELL_DCH.

Figure 1:
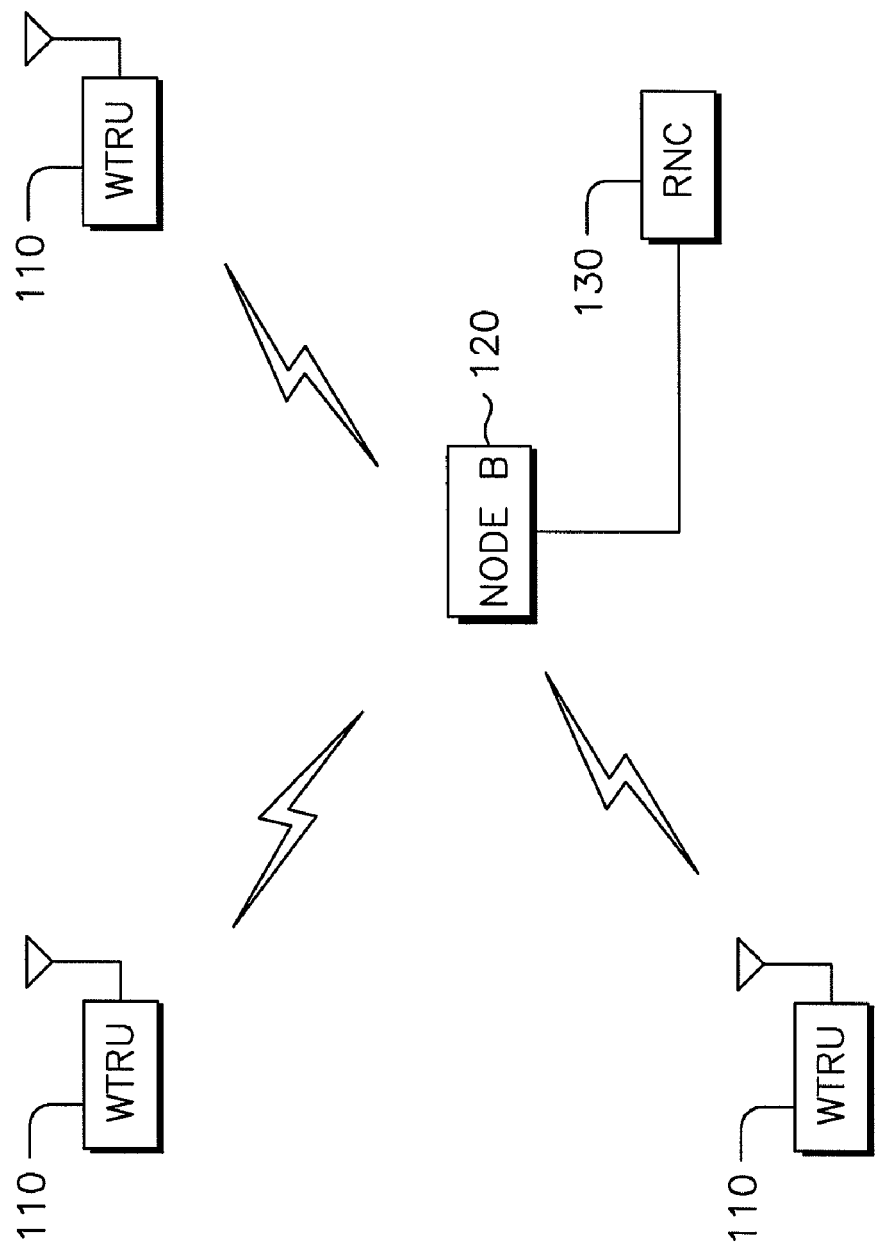
FIG. 1 shows an example wireless communication system including a plurality of wireless transmit/receive units (WTRUs) and a Node B.

FIG. 1 shows an example wireless communication system 100 including a plurality of WTRUs 110, a Node B 120, and a radio network controller (RNC) 130. As shown in FIG. 1, the WTRUs 110 are in communication with the Node B 120, which is in communication with the RNC 130. It should be noted that, although an example configuration of WTRUs 110, Node B 120, and RNC 130 is depicted in FIG. 1, any combination of wireless and wired devices may be included in the wireless communication system 100.

Figure 2:
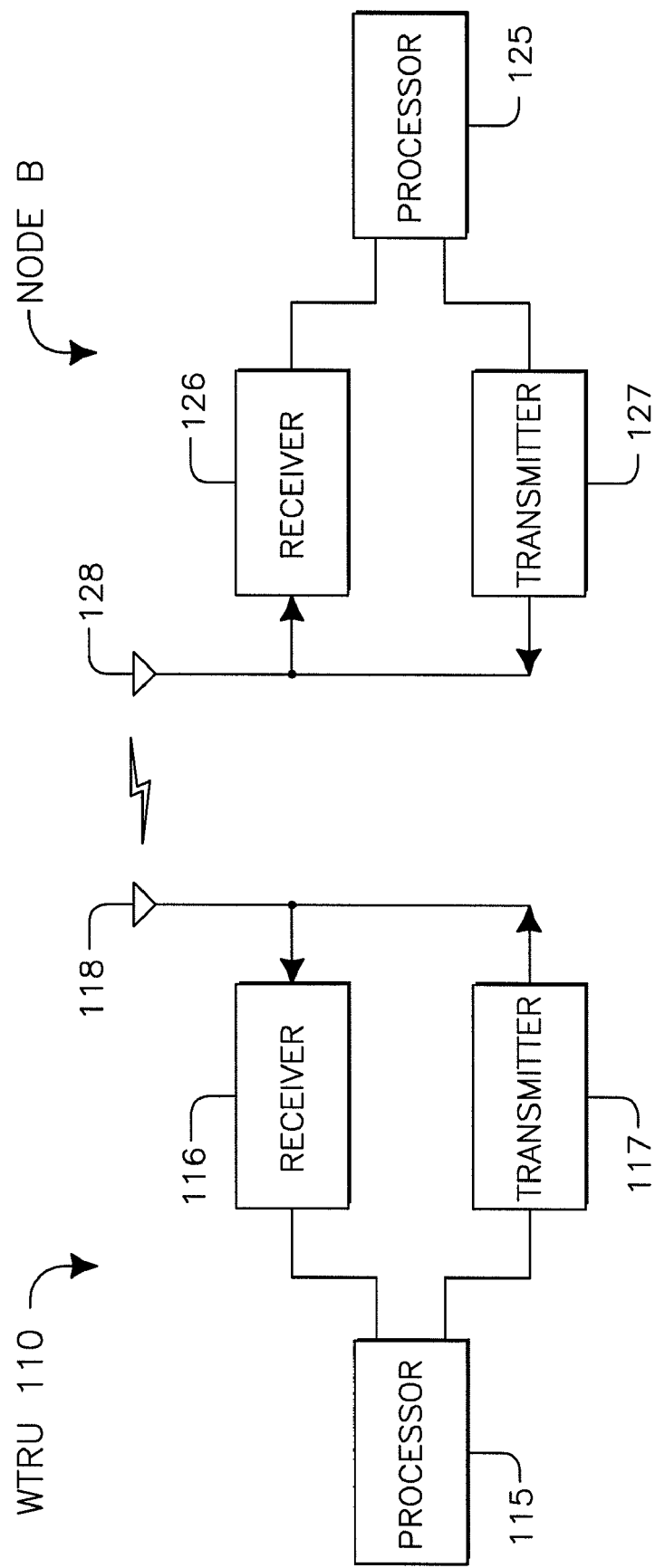
FIG. 2 is an example functional block diagram of a WTRU and the Node B of FIG. 1.

FIG. 2 is an example functional block diagram 200 of a WTRU 110 and the Node B 120 of the wireless communication system 100 of FIG. 1. As shown in FIG. 2, the WTRU 110 is in communication with the Node B 120. The Node B 120 is configured to handle cell reselections and transitions to and from an enhanced Cell_FACH state.

In addition to the components that may be found in a typical WTRU, the WTRU 110 includes a processor 115, a receiver 116, a transmitter 117, and an antenna 118. The receiver 116 and the transmitter 117 are in communication with the processor 115. The antenna 118 is in communication with both the receiver 116 and the transmitter 117 to facilitate the transmission and reception of wireless data. The processor 115 of the WTRU 110 is configured to handle cell reselections and transitions to and from an enhanced Cell_FACH state.

In addition to the components that may be found in a typical Node B, the Node B 120 includes a processor 125, a receiver 126, a transmitter 127, and an antenna 128. The receiver 126 and the transmitter 127 are in communication with the processor 125. The antenna 128 is in communication with both the receiver 126 and the transmitter 127 to facilitate the transmission and reception of wireless data.

Figure 3:
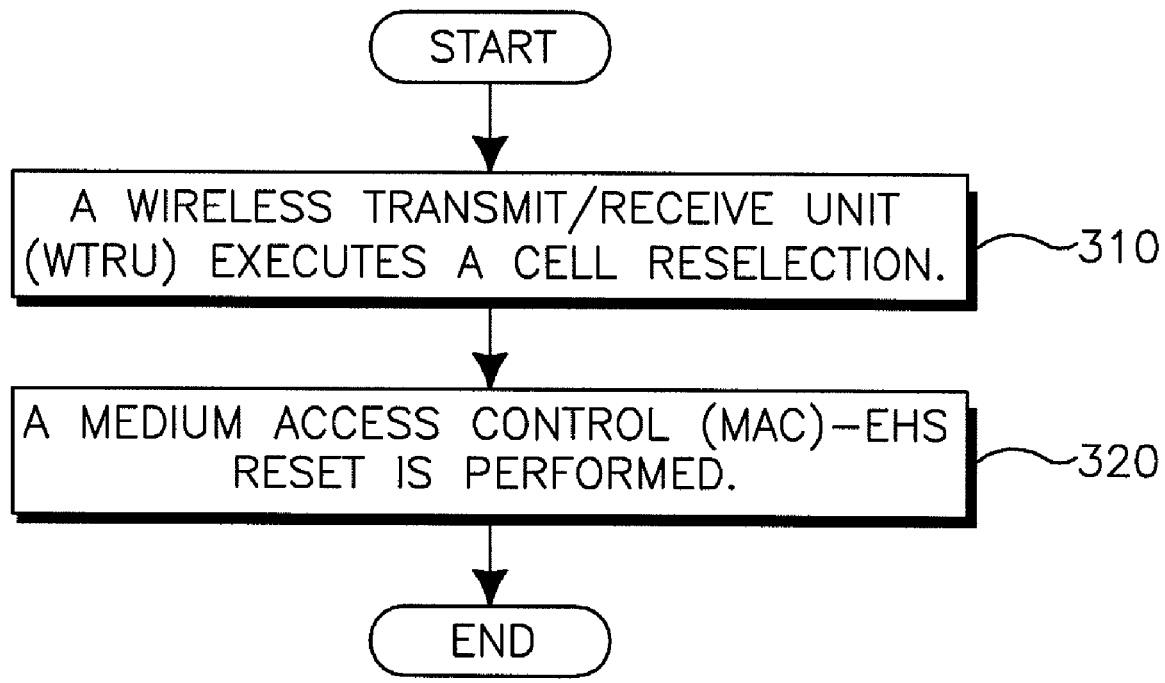
FIG. 3 is a flow diagram of a method for handling cell reselections and transitions to and from an enhanced CELL_FACH state.

FIG. 3 is a flow diagram of a method 300 for handling cell reselections out of an enhanced CELL_FACH state. Although specifics of the method 300 will be described in greater detail below, in general, a WTRU 110 executes a cell reselection (step 310). Upon executing the cell reselection, a medium access control (MAC)-ehs reset is performed (step 320) due to the fact that the source of the HS-DSCH may have changed. Depending on the reselected cell, the WTRU 110 may clear HSDPA resources and stop HS-DSCH reception procedures.

In one example, the MAC-hs/ehs reset is performed when a cell reselection occurs while the WTRU 110 is waiting for a CELL_UPDATE_CONFIRM message. The reset may be performed in all cases upon cell reselection, (i.e., even when the WTRU does not have a dedicated H-RNTI), or only when the WTRU has ongoing HSDPA reception, (i.e., when the WTRU is receiving HS-DSCH prior to cell reselection).

For example, if cell update/URA update timer expires or a reselection to another UTRA cell occurs prior to completion of the cell update or URA update procedure, the WTRU 110 may detect "in service area" if it has not entered idle mode. In this case, if the cell update or URA update procedure counter is less than or equal to a maximum number of retransmissions of the cell update/URA update message, then the WTRU 110 may perform a cell reselection.

For frequency division duplex (FDD), for example, if the WTRU 110 supports HS-DSCH reception and the information element (IE) "HS-DSCH common system information" is included in SIB5 or SIB5bis, then the WTRU 110 may reset the MAC-ehs entity.

Alternatively, the WTRU 110 may, after performing cell selection, reset the MAC-ehs entity after a radio link failure from CELL_DCH. As the WTRU 110 may be using a common H-RNTI, rather than a dedicated H-RNTI, a reset may allow reception of a new MAC flow, (e.g., for CCCH and SRB1).

For example, the WTRU 110 may initiate a cell update procedure as a result of a radio link failure while in CELL_DCH. For FDD, if the WTRU 110 supports HS-DSCH reception and the information element (IE) "HS-DSCH common system information" is included in SIB5 or SIB5bis, then the WTRU 110 may reset the MAC-ehs entity.

Alternatively, the WTRU 110 may, after performing a cell reselection without a dedicated H-RNTI, reset the MAC-ehs entity.

For example, the WTRU 110 may initiate a URA update or cell update procedure. If the WTRU 110 performed a cell reselection, then for FDD, if the WTRU 110 supports HS-DSCH reception and the information element (IE) "HS-DSCH common system information" is included in SIB5 or SIB5bis, then the WTRU 110 may reset the MAC-ehs entity.

WTRU 110 is allowed to use HS-DSCH reception in IDLE mode (such as after transmitting a RRC CONNECTION REQUEST). When the WTRU 110 transmits a RRC CONNECTION REQUEST, it monitors the downlink transmissions to determine the RNC response. During this time the WTRU 110 may perform cell reselections.

Depending on the reselected cell, the WTRU 110 may transition from a cell that supports HSDPA reception in CELL_FACH and CELL/URA_PCH to one that no longer supports HS-DSCH reception. The WTRU 110 may clear, or release HSDPA resources and stop HS-DSCH reception procedures.

For example, if the WTRU 110 has transmitted a RRC CONNECTION REQUEST and has not yet received an RRC CONNECTION SETUP message with the value of the IE "Initial UE identity" equal to the value of the variable INITIAL_UE_IDENTITY, and if cell re-selection or expiry of RRC CONNECTION REQUEST timers (currently referred to in the standard as T300 or T318) occurs, WTRU 110 may check that the RRC CONNECTION procedure counter (currently referred to in the standard as V300) is less than or equal to the maximum number of retransmissions of the RRC CONNECTION REQUEST message (currently referred to in the standard as N300), and if cell reselection occurred, for FDD, and if the WTRU 110 supports HS-DSCH reception and if IE: "HS-DSCH common system information" is not included in SIB5 or SIB5bis, then, the WTRU 110 may release HSDPA resources by stopping HS_SCCH and HS-DSCH reception procedures. Additionally, the WTRU 110 may clear the variable H_RNTI and remove any stored H-RNTI. In addition to resetting the MAC-ehs entity, the WTRU 110 may also release all HARQ resources.

Alternatively, the WTRU 110 may choose to perform the above only when HSDPA resources are being used prior to cell reselection.

Also, the WTRU 110 actions can be triggered by using an existing HS_DSCH_RECEPTION variable, or a new HS_DSCH_RECEPTION variable may be defined as a flag to denote HSDPA resource use, thereby triggering a resource release.

Depending on the reselected cell, the WTRU 110 may transition across cells that support HSDPA reception in CELL_FACH and CELL/URA_PCH. The WTRU may perform a MAC-ehs reset.

For example, if the WTRU 110 has transmitted a RRC CONNECTION REQUEST and has not yet received an RRC CONNECTION SETUP message with the value of the IE "Initial UE identity" equal to the value of the variable INITIAL_UE_IDENTITY, and if cell re-selection or expiry of RRC CONNECTION REQUST timers (T300 or T318) occurs, WTRU 110 may check that the RRC CONNECTION procedure counter (V300) is less than or equal to the maximum number of retransmissions of the RRC CONNECTION REQUEST message (N300), and if cell reselection occurred, for FDD, and if the WTRU 110 supports HS-DSCH reception and if IE: "HS-DSCH common system information" is included in SIB5 or SIB5bis, and if the variable HS-DSCH_RECEPTION_OF_CCCH_ENABLED is set to TRUE, then, the WTRU 110 may reset the MAC-ehs entity.

Depending on the reselected cell, the WTRU 110 may transition from a cell that does not support HSDPA reception in CELL_FACH and CELL/URA_PCH to one that does support HS-DSCH reception. In such a case, the WTRU 110 may be required to setup the HS-DSCH, (e.g., HARQ resources, common H-RNTI, MAC flow for CCCH traffic, and the like).

In this situation, a number of scenarios may be utilized. For example, if the WTRU 110 has transmitted a RRC CONNECTION REQUEST and has not yet received an RRC CONNECTION SETUP message with the value of the IE "Initial UE identity" equal to the value of the variable INITIAL_UE_IDENTITY, and if cell re-selection or expiry of RRC CONNECTION REQUST timers (T300 or T318) occurs, WTRU 110 may check that the RRC CONNECTION procedure counter (V300) is less than or equal to the maximum number of retransmissions of the RRC CONNECTION REQUEST message (N300), and if cell reselection occurred, for FDD, and if the WTRU 110 supports HS-DSCH reception and if IE: "HS-DSCH common system information" is included in SIB5 or SIB5bis, and if the variable HS-DSCH_RECEPTION_OF_CCCH_ENABLED is set to FALSE, then, the WTRU 110 may set the variable HS-DSCH_RECEPTION_OF_CCCH_ENABLED to TRUE, and start receiving HS-DSCH.

Alternatively, a WTRU 110 in IDLE mode may set the CCCH flag to TRUE in an R6 cell. In order to guarantee that HS_DSCH_RECEPTION_OF_CCCH_ENABLED is TRUE in an R6 cell the variable should be set to TRUE each time the system information is read in an R6 cell or anytime the WTRU 110 is in an R6 cell and transitions to IDLE mode from connected mode. This can be achieved by changing the actions when entering idle mode from connected mode.

As another alternative, every time a WTRU 110 in IDLE mode with an ongoing RRC connection procedure performs a cell reselection, the WTRU 110 sets the CCCH flag to TRUE and then performs the actions related to this variable. For example, the WTRU 110 may send an RRC CONNECTION REQUEST message and be waiting for an RRC CONNECTION SETUP MESSAGE. If there is a cell reselection, and the transition is from an R7 to R7 cell, the MAC-ehs entity is reset only. If the transition is from an R6 to R7 cell, the variable HS_DSCH_RECEPTION_OF_CCH_ENABLED is set to "true" and the WTRU 110 begins receiving the HS-DSCH. If the transistion is from an R7 to R6 cell, then HS_SCCH reception procedures are stopped, HS-DSCH reception procedures are stopped, the MAC-ehs entity is reset, HARQ resources are released, and store "HARQ info" IEs are cleared.

The variable HS_DSCH_RECEPTION_OF_CCCH_ENABLED is used as a flag to denote that the WTRU 110 is using a common H-RNTI. This variable should be set to "FALSE" when the WTRU 110 is not using its common H-RNTI. This may ensure that evaluation of the variable HS_DSCH_RECEPTON_CELL_FACH_STATE will correctly clear resources only when a dedicated H-RNTI is assigned to the WTRU 110. Receiving on the common H-RNTI is typically possible when the WTRU 110 has performed a cell reselection and is waiting for the CELL UPDATE CONFIRM message, or when the WTRU 110 has performed a URA reselection and is waiting for the URA UPDATE CONFIRM message, or when the WTRU 110 has initiated an RRC setup and is waiting for the RRC CONNECTION SETUP message.

After receiving an RRC CONNECTION SETUP message that will send the WTRU 110 in the CELL_DCH state, then the WTRU 110 sets variable HS_DSCH_RECEPTION_OF_CCCH_ENABLED to "FALSE".

The WTRU 110 may terminate activities associated with CELL_PCH. For example, the WTRU 110 should stop the periodic cell update timer. If the network requests a transition to CELL_FACH or if a new configuration is provided for CELL_PCH, the WTRU 110 should perform actions similar to those when transitioning to CELL_FACH.

For example, if the IE "Frequency info" is included in the received reconfiguration message, the WTRU 110 may select a suitable cell on the provided frequency. If the if IE "Frequency info" is not included in the received reconfiguration message, the WTRU 110 may prohibit periodical status transmission in the RLC, and it may start the timer currently referred to in the standard as T305. If the IE "New C-RNTI" is not included in the reconfiguration message, the WTRU 110 can clear variables C_RNTI, H_RNTI, as well as any stored HARQ information, and may also reset the MAC-ehs entity. The WTRU 110 may start monitoring the paging occasions on the selected PICH, and if the IE "UTRAN DRX cycle length coefficient" is included, it can use this value to determining the paging occasions.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for handling cell reselections, the method comprising:
   initiating a radio resource control (RRC) connection procedure from a user equipment (UE); and
   while the UE is in idle mode:
      performing cell reselection;
      determining whether high speed downlink shared channel (HS-DSCH) reception is ongoing based on received HS-DSCH common system information, wherein:
         if HS-DSCH reception is ongoing, performing a medium access control (MAC) reset; else, setting a HS-DSCH reception variable to TRUE and start receiving the HS-DSCH.

2. The method of claim 1, wherein initiating the RRC connection procedure comprises transmitting a RRC CONNECTION REQUEST message.

3. The method of claim 2, wherein an Initial UE identity information element (IE) in the transmitted RRC CONNECTION REQUEST message is set to the value of the variable INITIAL_UE_IDENTITY.

4. The method of claim 1, wherein the UE is in idle mode if, following initiation of the RRC connection procedure, the UE is waiting for receipt of a connection setup message.

5. The method of claim 4, wherein the connection setup message is a RRC CONNECTION SETUP message issued by a universal telecommunications radio access network (UTRAN).

6. The method of claim 4, wherein the UE is waiting for receipt of the connection setup message having a value of an Initial UE identity information element (IE) equal to the value of a variable INITIAL_UE_IDENTITY.

7. The method of claim 1, where in the HS-DSCH common system information is received in a HS-DSCH common system information IE (information element) in a System Information Block (SIB).

8. The method of claim 7, wherein HS-DSCH reception is ongoing if a variable HS_DSCH_RECEPTION_OF_CCCH_ENABLED in the HS-DSCH common system information IE is set to TRUE.

9. The method of claim 7, wherein HS-DSCH reception is not ongoing if a variable HS_DSCH_RECEPTION_OF_CCCH_ENABLED in the HS-DSCH common system information IE is not set to TRUE.

10. The method of claim 1, wherein setting the HS-DSCH reception variable to TRUE is setting the HS_DSCH_RECEPTION_OF_CCCH_ENABLED in the HS-DSCH common system information IE to TRUE, and start receiving HS-DSCH.

11. The method of claim 1, wherein performing cell reselection comprises reselecting between a cell that does not support HS-DSCH in cell forward access channel (Cell_FACH) and a cell that does support HS-DSCH in Cell_FACH.

12. The method of claim 1, further comprising:
   checking the value of V300; and
   determining that the value of V300 is equal to or smaller than N300.

13. The method of claim 1, further comprising an expiring of timer T300 or timer T318 while the UE is in the idle mode.

14. A user equipment (UE), the UE comprising:
a receiver;
a transmitter; and
a processor in communication with the receiver and the transmitter, the processor configured to:
initiate an radio resource control (RRC) connection procedure from a user equipment (UE); and
while the UE is in idle mode,
perform cell reselection;
determine whether high speed downlink shared channel (HS-DSCH)reception is ongoing based on received HS-DSCH common system information, wherein:
if HS-DSCH reception is ongoing, performing a medium access control (MAC) reset; else, set a HS-DSCH reception variable to TRUE and start receiving the HS-DSCH.

15. The UE of claim 14, wherein the processor is further configured to initiating the RRC connection procedure comprises transmitting a RRC CONNECTION REQUEST message.

16. The UE of claim 15, wherein an IE "Initial UE identity" in the transmitted RRC CONNECTION REQUEST message is set to the value of the variable INITIAL_UE_IDENTITY.

17. The UE of claim 14, wherein the UE is in idle mode if, following initiation of the RRC connection procedure, the UE is waiting for receipt of a connection setup message.

18. The UE of claim 17, wherein the connection setup message is a RRC CONNECTION SETUP message issued by a universal telecommunications radio access network (UTRAN).

19. The UE of claim 14, wherein the UE is waiting for receipt of the connection setup message having a value of an Initial UE identity information element (IE) equal to the value of a variable INITIAL_UE_IDENTITY.

20. The UE of claim 14, where in the HS-DSCH common system information is received in an HS-DSCH common system information IE in a System Information Block (SIB).

21. The UE of claim 20, wherein HS-DSCH reception is ongoing if a variable HS_DSCH_RECEPTION_OF_CCCH_ENABLED in the HS-DSCH common system information IE is set to TRUE.

22. The UE of claim 20, wherein HS-DSCH reception is not ongoing if a variable HS_DSCH_RECEPTION_OF_CCCH_ENABLED in the HS-DSCH common system information IE is not set to TRUE.

23. The UE of claim 14, wherein the processor is further configured to set the HS_DSCH_RECEPTION_OF_CCCH_ENABLED in the HS-DSCH common system information IE to TRUE, and initiate receipt of HS-DSCH.

24. The UE of claim 14, wherein performing cell reselection comprises reselecting between a cell that does not support HS-DSCH in cell forward access channel (Cell_FACH) and a cell that does support HS-DSCH in Cell_FACH.

25. The UE of claim 14, the processor further configured to:
checking the value of V300; and
determining that the value of V300 is equal to or smaller than N300.

26. The UE of claim 14, wherein the processor is further configured to detect an expiration of timer T300 or timer T318 while the UE is in the idle mode.

* * * * *